US012162267B2

(12) United States Patent
Yamaguchi et al.

(10) Patent No.: US 12,162,267 B2
(45) **Date of Patent: *Dec. 10, 2024**

(54) IMAGE FORMING APPARATUS CONFIGURED TO ACCOMMODATE ROLL MEDIA AND CUT MEDIA AND FEED TRAY THEREFOR

(71) Applicant: Brother Kogyo Kabushiki Kaisha, Nagoya (JP)

(72) Inventors: Masatomo Yamaguchi, Inazawa (JP); Satoshi Miyase, Nagoya (JP); Yuya Tatematsu, Nagoya (JP); Hideaki Yoshimune, Nagoya (JP); Gakuro Kanazawa, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,344

(22) Filed: Sep. 18, 2023

(65) Prior Publication Data

US 2024/0149593 A1 May 9, 2024

Related U.S. Application Data

(63) Continuation of application No. 17/563,365, filed on Dec. 28, 2021, now Pat. No. 11,806,991.

(30) Foreign Application Priority Data

Dec. 29, 2020 (JP) ................................ 2020-219778
Aug. 31, 2021 (JP) ................................ 2021-140668

(51) Int. Cl.
*B41J 11/00* (2006.01)
*B41J 11/48* (2006.01)
(Continued)

(52) U.S. Cl.
CPC .......... *B41J 11/0045* (2013.01); *B41J 11/485* (2013.01); *B41J 13/02* (2013.01);
(Continued)

(58) Field of Classification Search
CPC ...... B41J 11/0045; B41J 11/485; B41J 13/02; B41J 13/103; B41J 15/04; B41J 15/18;
(Continued)

(56) References Cited

U.S. PATENT DOCUMENTS 5,072,306 A 12/1991 Matsumoto et al.
6,168,325 B1 1/2001 Nagata
(Continued)

FOREIGN PATENT DOCUMENTS

JP H02264556 A 10/1990
JP H09-086004 A 3/1997

OTHER PUBLICATIONS

Feb. 16, 2023—(US) Non-Final Office Action—U.S. Appl. No. 17/563,365.

(Continued)

*Primary Examiner* — Henok D Legesse
(74) *Attorney, Agent, or Firm* — Banner & Witcoff, Ltd.

(57) ABSTRACT

An image forming apparatus includes a housing, a feeding tray inserted into and pulled out from the housing, an image forming unit, and first and second guide members. The feeding tray includes a first accommodation part in which a roll body having a configuration where a sheet-shaped medium is rolled in a roll shape is accommodated and a second accommodation part in which stacked sheet-shaped media are accommodated. The first guide member guides a sheet-shaped medium to a conveying path. The second guide member guides a roll medium unrolled from the roll body to the conveying path. The second guide member is movable between a guide position for guiding the roll medium to the
(Continued)

conveying path, and a retreat position further distant from the first guide member than the guide position and where the second guide member does not interfere with a sheet-shaped medium accommodated in the second accommodation part.

23 Claims, 8 Drawing Sheets

(51) Int. Cl.

| | |
|---|---|
| ***B41J 13/02*** | (2006.01) |
| ***B41J 13/10*** | (2006.01) |
| ***B41J 15/04*** | (2006.01) |
| ***B41J 15/18*** | (2006.01) |
| ***B41J 15/20*** | (2006.01) |
| ***B41J 15/22*** | (2006.01) |
| *G03G 15/00* | (2006.01) |

(52) U.S. Cl.
CPC ............. *B41J 13/103* (2013.01); *B41J 15/04* (2013.01); *B41J 15/18* (2013.01); *B41J 15/20* (2013.01); *B41J 15/22* (2013.01); *B65H 2405/10* (2013.01); *G03G 15/65* (2013.01); *G03G 15/6529* (2013.01)

(58) Field of Classification Search
CPC ....... B41J 15/20; B41J 15/22; B65H 2405/10; G03G 15/65; G03G 15/6529
See application file for complete search history.

(56) References Cited

U.S. PATENT DOCUMENTS 11,806,991 B2 * 11/2023 Yamaguchi .............. B41J 13/02
2004/0207707 A1 10/2004 Ohashi et al.

OTHER PUBLICATIONS

Jun. 16, 2023—(US)—Notice of Allowance—U.S. Appl. No. 17/563,365.

* cited by examiner

IMAGE FORMING APPARATUS CONFIGURED TO ACCOMMODATE ROLL MEDIA AND CUT MEDIA AND FEED TRAY THEREFOR

REFERENCE TO RELATED APPLICATIONS

This application is a continuation of U.S. patent application Ser. No. 17/563,365, filed Dec. 28, 2021, which claims priority from Japanese Patent Applications No. 2020-219778 filed on Dec. 29, 2020 and No. 2021-140668 filed on Aug. 31, 2021. The contents of the aforementioned applications are incorporated herein by reference in their entirety.

BACKGROUND ART

Technical Field

The present disclosure relates to an image forming apparatus including a feeding tray capable of accommodating both a roll body and a cut medium.

Background

An image forming apparatus capable of accommodating both a roll body having a configuration where a sheet-shaped paper is rolled in a roll shape and a cut sheet is known. For example, JP-A-H02-264556 discloses a facsimile (image forming apparatus) having a sheet feeding cassette (feeding tray) where a placement part for a roll body and a placement part for a cut sheet are formed. The feeding tray can be inserted into and pulled out from a facsimile body (housing).

Here, a tip end of the roll sheet unrolled from the roll body is curled along a rolling direction. Therefore, the roll sheet (roll medium) that is unrolled and conveyed from the roll body accommodated in the feeding tray may not be appropriately guided to a conveying path.

DESCRIPTION

Summary

An object of the present disclosure is to provide an image forming apparatus including a feeding tray capable of being inserted into and pulled out from a housing and accommodating a roll body and a cut medium, and which enables to appropriately guide a roll medium unrolled from the roll body and a cut medium accommodated in the feeding tray to a conveying path.

An aspect of the present disclosure is an image forming apparatus including:

- a housing in which a conveying path is formed;
- a feeding tray capable of being inserted into and pulled out from the housing, and including a first accommodation part in which a roll body having a configuration where a sheet-shaped medium is rolled in a roll shape is accommodated and a second accommodation part in which a plurality of sheet-shaped media are accommodated in a state of being stacked;
- an image forming unit configured to form an image on a sheet-shaped medium provided in the conveying path;
- a first guide member configured to guide a sheet-shaped medium to the conveying path; and
- a second guide member supported on the housing and configured to guide a roll medium, which is a sheet-shaped medium unrolled from the roll body, to the conveying path,
- in which the second guide member is located on an opposite side to the first guide member, the roll medium being interposed between the first guide member and the second guide member, and
- the second guide member is further configured to be movable between a guide position where the second guide member guides the roll medium to the conveying path, and a retreat position that is further distant from the first guide member than the guide position and where the second guide member does not interfere with a sheet-shaped medium accommodated in the second accommodation part.

According to the present disclosure, by moving the second guide member to the retreat position, the second guide member does not interfere with the cut medium accommodated in the second accommodation part. This allows the cut medium to be appropriately accommodated in the second accommodation part and also the cut medium accommodated in the second accommodation part to be appropriately guided to the conveying path by the first guide member. In addition, by moving the guide member to the guide position, the roll medium unrolled from the roll body can be appropriately guided to the conveying path by the second guide member. This allows the roll medium unrolled from the roll body and the cut medium to be appropriately guided to the conveying path in the image forming apparatus including the feeding tray capable of being inserted into and pulled out from the housing and accommodating the roll body and the cut medium.

DETAILED DESCRIPTION

Hereinafter, a printer 100 (the image forming apparatus of the present disclosure) according to a preferred embodiment of the present disclosure will be described with reference to FIGS. 1 to 6. Note that, the upper and lower direction, the right and left direction and the front and rear direction shown in FIG. 1 are referred to as the upper and lower direction, the right and left direction and the front and rear direction of the printer 100.

(Overall Configuration of Printer 100)

Figure 1:
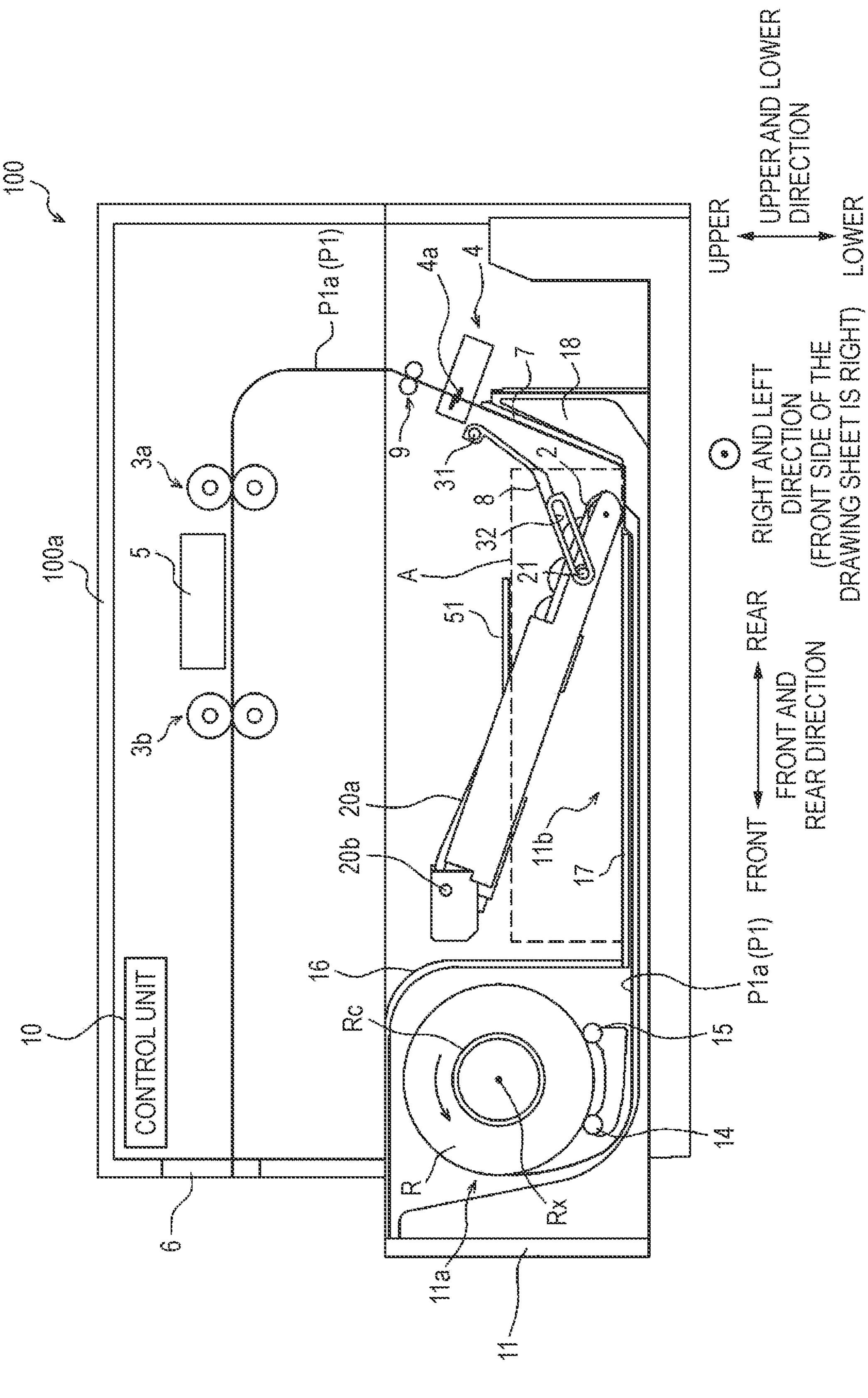
FIG. 1 is a schematic configuration view of a printer according to an embodiment of the present disclosure.

As shown in FIG. 1, the printer 100 includes a housing 100*a*, a feeding tray 11, a feed roller 2, a conveying roller pair 3*a*, a sheet discharging roller pair 3*b*, a cutter mechanism 4, a head 5 (the image forming unit of the present disclosure), a sheet discharging tray 6, a first guide member 7, a second guide member 8, an intermediate roller pair 8, and a control unit 9. The feeding tray 11 can be inserted into and pulled out from a lower part of the housing 100*a*. The sheet discharging tray 6 configures a front sidewall of an upper part of the housing 100*a* and can be opened and closed with respect to the housing 100*a*. Note that, in FIG. 3, only a part of the lower side of the housing 100*a* is shown.

The feeding tray 11 can be inserted into and pulled out from the housing 100*a* in the front and rear direction. That is, the "insertion/pullout direction of the feeding tray" of the present disclosure is the front and rear direction in the present embodiment. The feeding tray 11 has a first accommodation part 11*a* in which a roll body R having a configuration where a long-length sheet P1 (the sheet-shaped medium of the present disclosure) is rolled in a roll shape can be accommodated and a second accommodation part 11*b* in which a plurality of cut sheets P2 (the sheet-shaped media of the present disclosure, refer to FIG. 2) can be accommodated in a state of being stacked. The cut sheet P2 is a sheet shorter than the long-length sheet P1. In addition, a rear end wall part 18 extending upward is formed at a rear end portion of the feeding tray 11, i.e., an upstream end portion of the feeding tray 11 in a pullout direction from the housing 100*a*. The rear end wall part 18 is a member for preventing the cut sheet P2 accommodated in the second accommodation part 11*b* from falling off at the time when the feeding tray 11 is inserted into and pulled out from the housing 100*a*.

The first accommodation part 11*a* has a cylindrical core member Rc, two rollers 14 and 15, and a roll cover 16. The roll body R is one where the long-length sheet P1 is rolled in a roll shape on an outer peripheral surface of the cylindrical core member Rc. The roll body R is arranged so that an axis direction (a direction perpendicular to the drawing sheet of FIG. 1) along a rotation axis Rx (a central axis of the core member Rc) is parallel to the right and left direction. The axis direction of the rotation axis Rx also corresponds to width directions of the long-length sheet P1 and the cut sheet P2.

The two rollers 14 and 15 extend lengthwise along the right and left direction and are formed slightly longer than a width of the roll body R. The roller 15 is arranged behind the roller 14. The rollers 14 and 15 are arranged so that rotation axes thereof are parallel to the rotation axis Rx. The two rollers 14 and 15 are configured to support the roll body R from below in a state of being in contact with an outer peripheral surface of a lower part of the roll body R.

When the long-length sheet P1 is unrolled from the roll body R, the two rollers 14 and 15 rotate according to the roll body R rotating in a counterclockwise direction (a solid line arrow in FIG. 1). In the present embodiment, the long-length sheet P1 unrolled from the roll body R accommodated in the first accommodation part 11*a* is referred to as roll sheet P1*a* (the roll medium of the present disclosure). The roll sheet P1*a* unrolled from the roll body R accommodated in the first accommodation part 11*a* passes through a path under a bottom surface 17 (which will be described later) of the second accommodation part 11*b* and is sent to the feed roller 2.

The roll cover 16 is a member configured to cover the roll body R accommodated in the first accommodation part 11*a*. The roll cover 16 extends along the right and left direction and is formed longer than widths of the rollers 14 and 15. The roll cover 16 is also arranged to be able to be close to the outer peripheral surface of the roll body R of a maximum size that can be accommodated in the first accommodation part 11*a*. As a result, even if the roll body R is loosened and therefore the outer diameter of the roll body R is to increase, the outer peripheral surface of the roll body R comes into contact with an inner surface of roll cover 16, so that it is possible to restrict an increase in outer diameter.

The second accommodation part 11*b* is located behind the first accommodation part 11*a*, and has a bottom surface 17 configured to support the cut sheet P2 from below. The bottom surface 17 extends lengthwise along the right and left direction, and is formed slightly longer than the width of the cut sheet P2.

In addition, the second accommodation part 11*b* is provided with an indicator 51 for indicating a highest position of the stacked cut sheets P2 in which the maximum number of cut sheets P2 are accommodated in the second accommodation part 11*b*. The indicator 51 has, for example, a rib shape protruding inward from an inner surface of the feeding tray 11. The indicator 51 is formed along the front and rear direction. Note that, the maximum number of cut sheets P2 to be accommodated is, for example, 500 sheets.

In addition, a rear end part of the bottom surface 17 of the second accommodation part 11*b*, which is a central part in the right and left direction, has a notched portion. When printing the roll sheet P1*a*, as described above, the roll sheet P1*a* unrolled from the roll body R passes through the path under the bottom surface 17 of the second accommodation part 11*b* and is sent to the feed roller 2. The roll sheet P1*a* comes then into contact with the feed roller 2 from the notched portion of the bottom surface 17 of the second accommodation part 11*b* in a state where the cut sheet P2 is not accommodated, and is thus fed toward the conveying path. When printing the cut sheet P2, the cut sheets P2 multiply stacked on the bottom surface 17 are sent to the conveying path by the feed roller 2.

In the present embodiment, the roll sheet P1*a* unrolled from the roll body R accommodated in the first accommodation part 11*a* is fed toward the conveying path by the feed roller 1, and is sent to the sheet discharging tray 6 via the intermediate roller pair 9, the conveying roller pair 3*a*, the head 5, and the sheet discharging roller pair 3*b*. The conveying path for the roll sheet P1*a* is defined by the feed roller 2, the intermediate roller pair 9, the conveying roller pair 3*a*, and the sheet discharging roller pair 3*b*. In addition, the cut sheet P2 accommodated in the second accommodation part 11*b* is fed toward the conveying path by the feed roller 2, and is sent to the sheet discharging tray 6 via the intermediate roller pair 9, the conveying roller pair 3*a*, the head 5, and the sheet discharging roller pair 3*b*. The conveying path for the cut sheet P2 is defined by the feed roller 2, the intermediate roller pair 9, the conveying roller pair 3*a*, and the sheet discharging roller pair 3*b*. Therefore, the conveying paths for the roll sheet P1*a* and the cut sheet P2 are formed inside the housing 100*a*.

Note that, in the present embodiment, when printing the roll sheet P1*a*, the cut sheet P2 is not accommodated in the second accommodation part 11*b*. In addition, when printing the cut sheet P2, the roll sheet P1*a* is not unrolled from the roll body R accommodated in the first accommodation part 11*a* or the roll body R is not accommodated in the first accommodation part 11*a*. In addition, in the present embodiment, when inserting the feeding tray 11 into the housing 100*a*, at least a part of the first accommodation part 11*a* and the entire second accommodation part 11*b* are in a state of being placed inside the housing 100*a*.

The feed roller 2 is arranged behind the first accommodation part 11*a* and near the rear end portion of the second accommodation part 11*b*. The feed roller 2 is configured to rotate by drive of a feeding motor (not shown), thereby feeding the roll sheet P1*a* and the cut sheet P2 from the feeding tray 11 to the conveying path. As described above, the conveying path for the roll sheet P1*a* and the conveying path for the cut sheet P2 are all defined by the feed roller 2, the intermediate roller pair 9, the conveying roller pair 3*a*, and the sheet discharging roller pair 3*b*. Therefore, the feed roller 2 is configured to feed the roll sheet P1*a* and the cut sheet P2 along the common conveying path.

Figure 3:
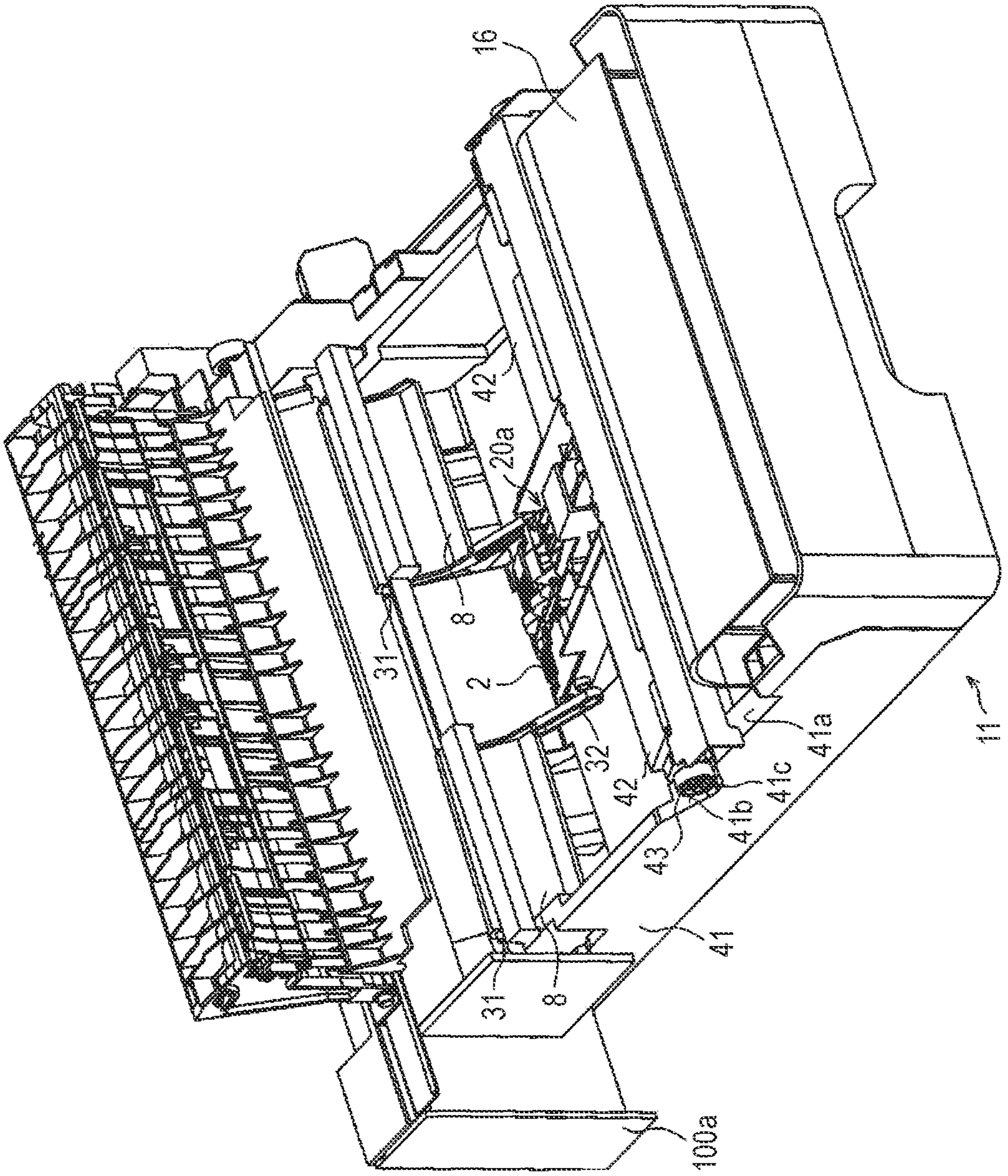
FIG. 3 is a schematic perspective view showing a part of a housing and a feeding tray.

In addition, the printer 100 of the present embodiment has a swing arm 20*a* configured to support the feed roller 2 to be rotatable and a swing shaft 20*b* configured to support the swing arm 20*a*, which is to be swingable, on the housing 100*a*. As shown in FIGS. 1 and 3, the swing arm 20*a* is provided with two convex portions 21 extending rightward and leftward from the swing arm 20*a* in the right and left direction. The convex portion 21 will be described in a section of the second guide member 2, which will be described later. A direction of a rotation axis of the swing shaft 20*b* is parallel to the right and left direction. Note that, the swing shaft 20*b* may be configured to support the swing arm 20*a* on the housing 100*a* directly or indirectly.

In addition, the printer 100 includes a retreat mechanism 40 configured to move the feed roller 2 and the swing arm 20*a* to a position where the feed roller 2 and the swing arm 20*a* dos not interfere with the feeding tray 11 when the feeding tray 11 is inserted into and pulled out from the housing 100*a*. The retreat mechanism 40 includes a horizontal surface 41*a* and inclined surfaces 41*b* and 41*c* of a sidewall 41 of the feeding tray 11, and a cylindrical member 43.

Figure 5:
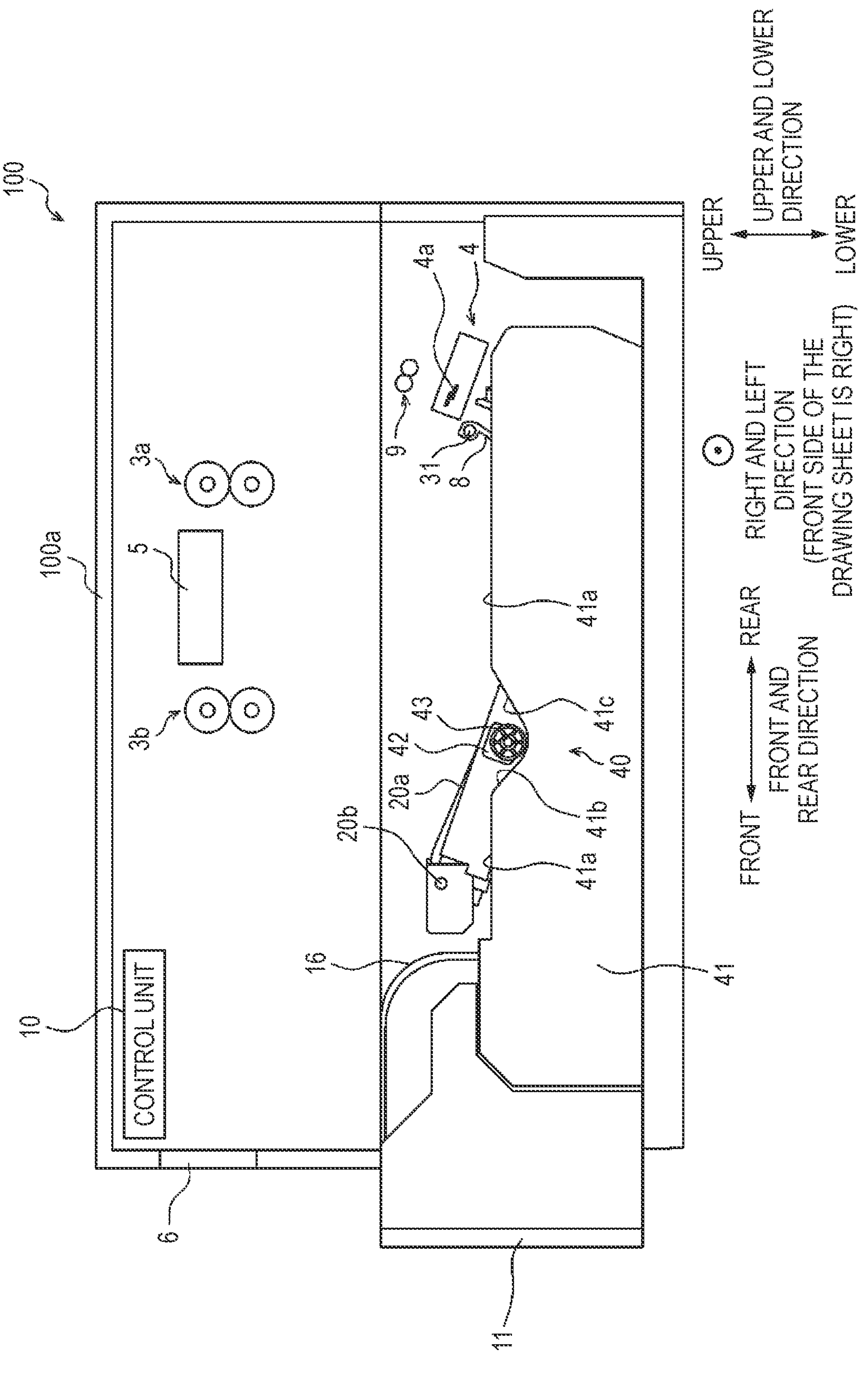
FIG. 5 is a schematic configuration view of a retreat mechanism at the time when the feeding tray is inserted in the housing.

As shown in FIGS. 3 and 5, the cylindrical member 43 is supported on tip ends of extension parts 42 extending rightward and leftward from the swing arm 20*a* in the right and left direction to positions of sidewalls 41 on both sides of the feeding tray 11. In addition, the horizontal surface 41*a* and the inclined surfaces 41*b* and 41*c* are formed at an upper part of the sidewall 41 of the feeding tray 11. The inclined surface 41*b* is inclined downward from the front toward the rear near a center of the horizontal surface 41*a* horizontally extending over the entire upper part of the sidewall 41. The inclined surface 41*c* is inclined upward from the front toward the rear in a position near the center of the horizontal surface 41*a* and behind the inclined surface 41*b*. In addition, a rear end of the inclined surface 41*b* and a front end of the inclined surface 41*c* connect each other, a front end of the inclined surface 41*b* connects to the horizontal surface 41*a*, and a rear end of the inclined surface 41*c* connects to the horizontal surface 41*a*. The cylindrical member 43 is configured to be movable along the horizontal surface 41*a* and the inclined surfaces 41*b* and 41*c*.

Figure 4:
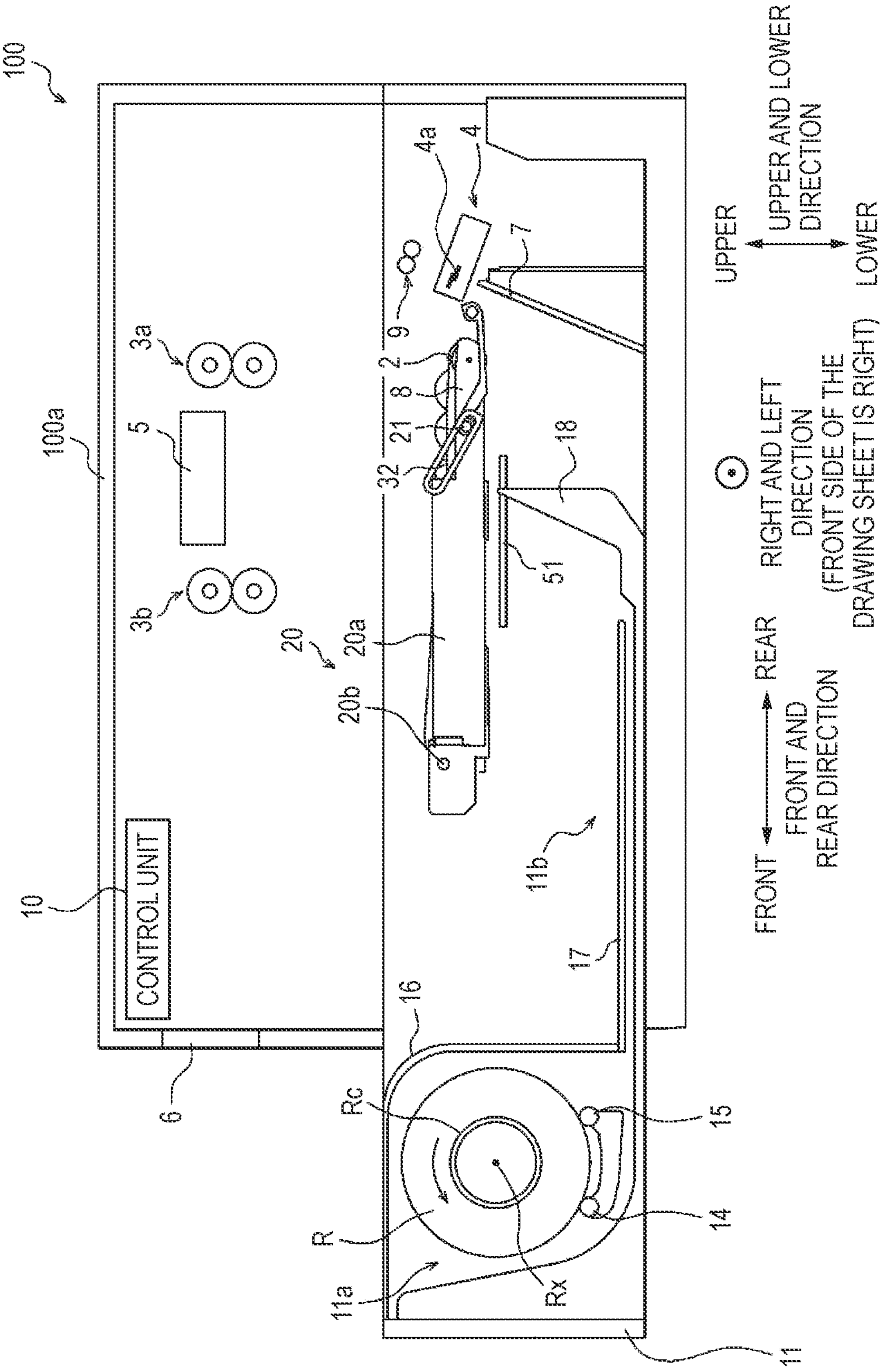
FIG. 4 is a schematic configuration view of the printer at the time of inserting or pulling out the feeding tray.
Figure 6:
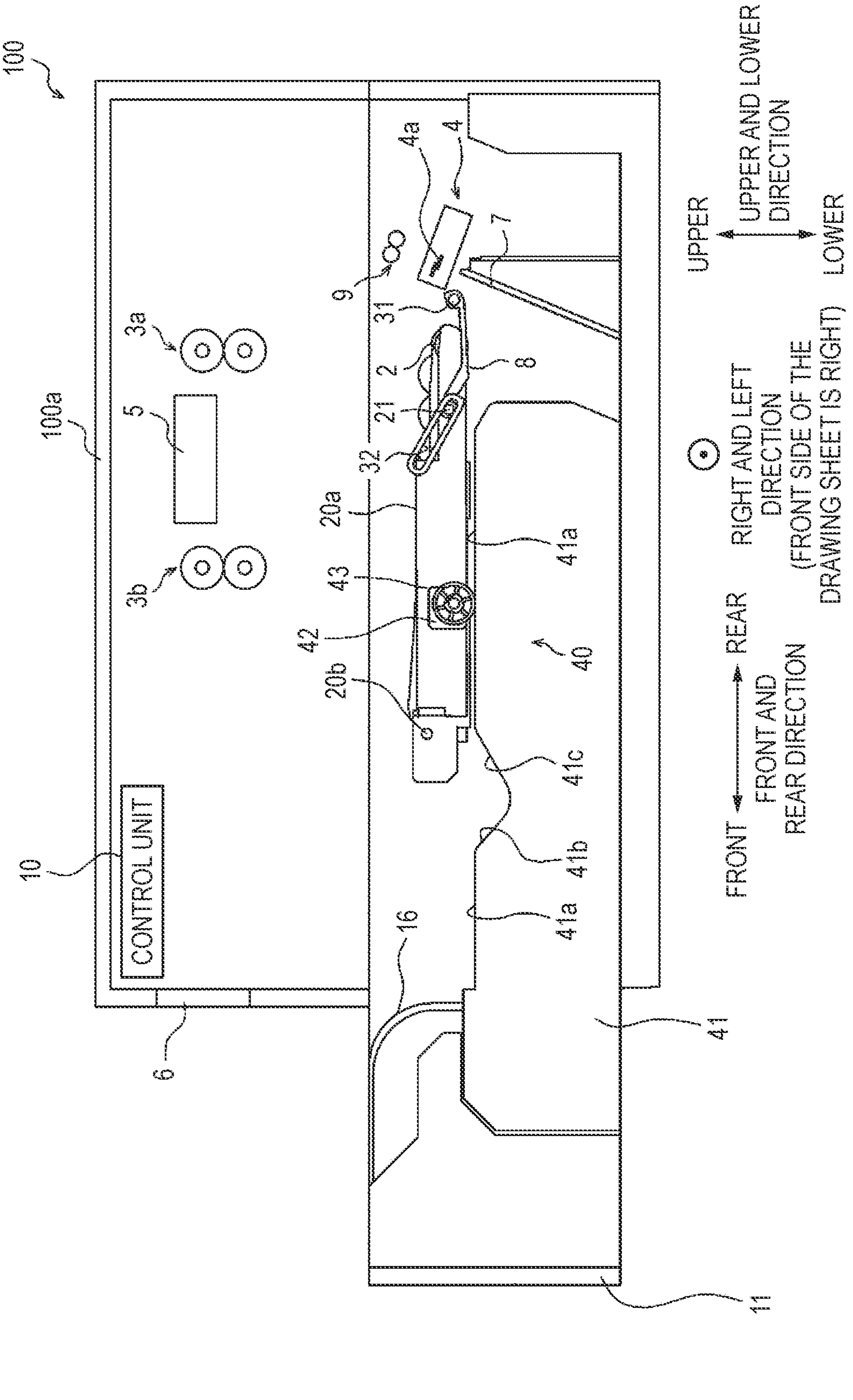
FIG. 6 is a schematic configuration view of the retreat mechanism at the time of inserting or pulling out the feeding tray.

In a state where the feeding tray 11 is inserted in the housing 100*a*, as shown in FIG. 5, the cylindrical member 43 is arranged on the vicinity of the connection portion of the inclined surface 41*b* and the inclined surface 41*c*. At this time, the feed roller 2 is moved to a position in contact with the roll sheet P1*a* or a position in contact with the cut sheet P2. In contrast, when pulling out the feeding tray 11 from the housing 100*a* or when inserting the feeding tray 11 pulled out from the housing 100*a* into the housing 100*a*, as the feeding tray 11 is moved forward with respect to the housing 100*a*, the cylindrical member 43 is arranged on the horizontal surface 41*a* behind the inclined surface 41*c*, as shown in FIG. 6. This allows the retreat mechanism 40 to move the feed roller 2 and the swing arm 20*a* to a position where the feed roller 2 and the swing arm 20*a* do not interfere with the feeding tray 11 when the feeding tray 11 is inserted into and pulled out from the housing 100*a*, as shown in FIG. 4. Note that, in the present embodiment, the "position of the feed roller 2 and the swing arm 20, which does not interfere with the feeding tray 11", is a position above the rear end wall part 18 of the feeding tray 11. However, in a case where a constitutional member of the feeding tray 11 positioned above the rear end wall part 18 is present behind the feed roller 2 and the swing arm 20 in the front and rear direction, a position above the constitutional member of the feeding tray 11 is the "position where the feed roller 2 and the swing arm 20 do not interfere with the feeding tray 11".

The cutter mechanism 4 is arranged in a position on a further downstream side than the feed roller 2 in a conveying direction (hereinafter, simply referred to as "conveying direction") along the conveying path of the roll sheet P1*a* and the cut sheet P2 and on a further upstream side than the head 5 (which will be described later) in the conveying direction. The cutter mechanism 4 includes, for example, cutters 4*a*, which are two rotating blades, and a cutting motor (not shown) configured to reciprocally drive the cutters 4*a* in the axis direction. The roll sheet P1*a* unrolled from the roll body R and conveyed along the conveying path is cut in the width direction of the roll sheet P1*a* by the cutters 4*a* as the cutting motor is driven under control of the control unit 10. This forms a rear end on the roll sheet P1*a* that is sent to the sheet discharging tray 6.

The intermediate roller pair 9 is provided on a further downstream side than the cutter mechanism 4 in the conveying direction and on a further upstream side than the head 5 in the conveying direction. The intermediate roller pair 9 is configured to convey the roll sheet P1*a* and the cut sheet P2 to the conveying roller pair 3*a*. The intermediate roller pair 9 is configured by a drive roller configured to rotate by drive of an intermediate motor (not shown) and a driven roller configured to rotate according to the drive roller.

The conveying roller pair 3*a* is configured by a drive roller configured to rotate by drive of a conveying motor (not shown) and a driven roller configured to rotate according to the drive roller. The sheet discharging roller pair 3*b* is configured by a drive roller configured to rotate by drive of a sheet discharging motor (not shown) and a driven roller configured to rotate according to the drive roller. The conveying motor and the sheet discharging motor (not shown) are driven under control of the control unit 10, and therefore, the conveying roller pair 3*a* and the sheet discharging roller pair 3*b* rotate while sandwiching the roll sheet P1*a* (or cut sheet P2), so that the roll sheet P1*a* (or cut sheet P2) is conveyed. Note that, the drive roller of the conveying roller pair 3*a* and the drive roller of the sheet discharging roller pair 3*b* may also be configured to drive by a common conveying motor (not shown). In this case, for example, the conveying roller pair 3*a* and the sheet discharging roller pair 3*b* are coupled to each other by a belt.

The head 5 is to form an image on the roll sheet P1*a* and the cut sheet P2, and is arranged on a further downstream side than the conveying roller pair 3*a* in the conveying direction and on a further upstream side than the sheet discharging roller pair 3*b* in the conveying direction. The head 5 includes a plurality of nozzles (nozzle) formed on a lower surface and a driver IC. When the driver IC is driven by control of the control unit 10, ink is ejected from the nozzles. When the roll sheet P1*a* (or cut sheet P2) conveyed by the conveying roller pair 3*a* passes through a position facing the lower surface of the head 5, the ink is ejected from the nozzles of the head 5, thereby forming an image on the long-length roll sheet P1 and the cut sheet P2. Note that, the head 5 may be either a line-type configured to eject the ink from the nozzles in a state where a position is fixed or a serial-type configured to eject the ink from the nozzles while moving in the axis direction of the rotation axis Rx. The roll sheet P1*a* (or cut sheet P2) on which the image is formed by the head 5 is accommodated on the sheet discharging tray 6 in an open state with respect to the housing 100*a*.

In the present embodiment, the horizontal components in the conveying direction of the roll sheet P1*a* and the cut sheet P2 that are fed by the feed roller 2 are a direction from the front toward the rear in the front and rear direction, and the horizontal components in the conveying direction of the roll sheet P1*a* and the cut sheet P2 that pass through the position facing the lower surface of the head 5 and are discharged from the sheet discharging tray 6 in an open state to an outside are a direction from the rear toward the front in the front and rear direction. That is, the printer 100 of the present embodiment has a so-called U-turn path configuration where the conveying direction is folded back on the way.

The control unit 10 is connected to the feeding motor, the intermediate motor, the conveying motor, the sheet discharging motor, the driver IC, the cutting motor, and the like via an internal bus (not shown). The control unit 10 has a CPU (Central Processing Unit), a ROM (Read Only Memory) and a RAM (Random Access Memory). In the ROM, programs and data for the CPU to perform various controls are stored. The RAM is configured to temporarily store data that is used when the CPU runs programs.

The first guide member 7 is supported on the housing 100*a*. The first guide member 7 is provided behind the feed roller 2 and on a further upstream side than the cutter mechanism 4 in the conveying direction. The first guide member 7 is to guide the roll sheet P1*a* and the cut sheet P2 fed by the feed roller 2 toward the cutter mechanism 4 along the conveying path. As shown in FIG. 1, the first guide member 7 is inclined so that it is located upward from the front toward the rear in the front and rear direction. The first guide member 7 extends lengthwise along the right and left direction, and is formed slightly longer than the widths of the roll sheet P1*a* and the cut sheet P2. A fine unevenness pattern repeating along the conveying direction is formed on a surface of the first guide member 7. Here, the short-length sheet such as the cut sheet P2 is separated, so that double feeding can be prevented.

The second guide member 8 is supported on the housing 100*a*. As shown in FIG. 1, the second guide member 8 is located in front of the first guide member 7. That is, the second guide member 8 is located on an opposite side to the first guide member 7. The roll sheet P1*a* unrolled from the roll body R is interposed between the first guide member 7 and the second guide member 8. The second guide member 8 is arranged on each of both sides outer than the swing arm 20*a* in the right and left direction, and each extends lengthwise in the right and left direction. A length from a left end of the second guide member 8 on the left side of the swing arm 20*a* to a right end of the second guide member 8 on the right side of the swing arm 20*a* is formed slightly longer than the widths of the roll sheet P1*a* and the cut sheet P2 on the conveying path. In addition, the second guide member 8 is inclined so that it is located upward from the front toward the rear in the front and rear direction. In the present embodiment, an inclination angle of the second guide member 8 relative to the upper and lower direction is greater than an inclination angle of the first guide member 7 relative to the upper and lower direction. The second guide member 8 has a rotary shaft 31 at one end portion on a downstream side in the conveying direction along the conveying path, i.e. at one end portion of a side close to the cutter mechanism 4 in FIG. 1. An axis direction of the rotary shaft 31 is parallel to the right and left direction. The second guide member 8 is configured to be rotatable about the rotary shaft 31.

In addition, the second guide member 8 has a long hole portion 32, which is formed along a direction orthogonal to the extension direction (right and left direction) of the convex portion 21 of the swing arm 20*a* and the convex portion 21 is inserted therein. As shown in FIG. 3, a part of the second guide member 8, which defines the long hole portion 32, does not extend along the right and left direction. The second guide member 8 is configured so that it can move in conjunction with movement of the swing arm 20*a* as the convex portion 21 moves along an inner surface of the long hole portion 32.

Figure 2:
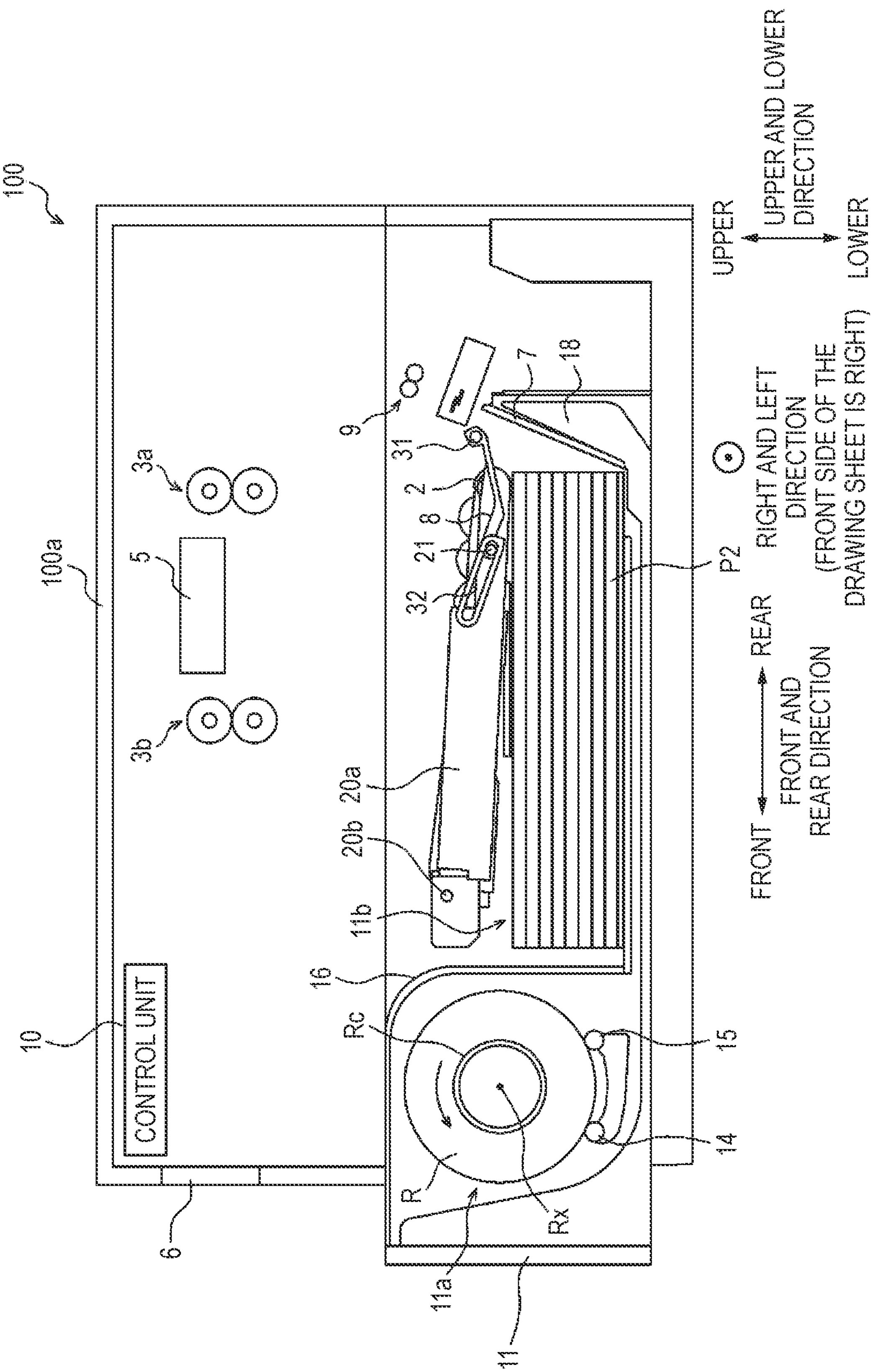
FIG. 2 is a schematic configuration view of the printer at the time of accommodating a cut sheet.

The second guide member 8 is configured to be rotatable about the rotary shaft 31, in conjunction with movement of the swing arm 20*a*, thereby moving between a guide position (a state shown in FIG. 1) where the second guide member guides the roll sheet P1*a* to the cutter mechanism 4 along the conveying path, and a retreat position (a state shown in FIG. 2) that is further distant from the first guide member 7 than the guide position and where the second guide member does not interfere with the cut sheet P2 accommodated in the second accommodation part 11*b*. In the present embodiment, the "position that is further distant from the first guide member 7 than the guide position" is a position above and in front of the guide position. As shown in FIG. 1, when the second guide member 8 is in the guide position, a part of the second guide member 8 is arranged in an accommodation area A where the cut sheet P2 can be accommodated in the second accommodation part 11*b*. The accommodation area A is an area of the second accommodation part 11*b* above the bottom surface 17 and below the indicator 51, including both ends and an inner side thereof in the front and rear direction and both ends and an inner side thereof in the right and left direction of the cut sheet P2 placed on the bottom surface 17. In addition, as shown in FIG. 2, when the second guide member 8 is in the retreat position, the entire second guide member 8 is arranged outside the accommodation area A and above the indicator 51.

When conveying the roll sheet P1*a*, as shown in FIG. 1, the swing arm 20*a* swings about the swing shaft 20*b*, so that the feed roller 2 comes into contact with the roll sheet P1*a* unrolled from the roll body R accommodated in the first accommodation part 11*a*. The second guide member 8 is moved to the guide position, in conjunction with swinging of the swing arm 20*a*. The feed roller 2 is arranged between the rotary shaft 31 and the swing shaft 20*b* in the front and rear direction when the second guide member 8 is in the guide position. The conveying path for the roll sheet P1*a* between the first guide member 7 and the second guide member 8 when the second guide member 8 is in the guide position becomes narrower toward the cutter mechanism 4. This makes it easy to guide the roll sheet P1*a* with a curled tip end to the conveying path. When conveying the cut sheet P2, as shown in FIG. 2, the swing arm 20*a* swings about the swing shaft 20*b*, so that the feed roller 2 comes into contact with the cut sheet P2 accommodated in a state of being multiply stacked in the second accommodation part 11*b*. The second guide member 8 is moved to the retreat position, in conjunction with swinging of the swing arm 20*a*. Note that, as shown in FIGS. 1 and 2, the second guide member 8 is bent in a direction from the guide position toward the retreat position. In the present embodiment, the second guide member 8 has an inverted L shape, when seen from the right toward the left in the right and left direction.

In addition, as shown in FIG. 6, when the feeding tray 11 is inserted into and pulled out from the housing 100*a*, the second guide member 8 can move to the retreat position, in conjunction with movement of the swing arm 20*a*. As described above, when the feeding tray 11 is inserted and pulled out from the housing 100*a*, the retreat mechanism 40 moves the swing arm 20*a* to the position where the swing arm 20*a* does not interfere with the feeding tray 11. At this time, the convex portion 21 provided to the swing arm 20*a* moves along the long hole portion 32 of the second guide member 8, so that the second guide member 8 moves to the retreat position. Note that, when the second guide member 8 is in the retreat position, the second guide member 8 does not interfere with the feeding tray 11 while the feeding tray 11 is inserted into and pulled out from the housing 100*a*. Note that, in the present embodiment, the description "does not interfere with the feeding tray 11" is similar to the definition of the "above-described position of the feed roller 2 and the swing arm 20*a*, which does not interfere with the feeding tray 11".

As described above, the printer 100 of the present embodiment has the housing 100*a* having the conveying path formed therein, the feeding tray 11 capable of accommodating the roll body R and the cut sheet P2, the first guide member 7 configured to guide the roll sheet P1*a* and the cut sheet P2 to the conveying path, and the second guide member 8 configured to guide the roll sheet P1*a* to the conveying path. The second guide member 8 is located on an opposite side to the first guide member 7. The roll sheet P1*a* is interposed between the first guide member 7 and the second guide member 8. The second guide member 8 is configured to be movable between the guide position where the second guide member guides the roll sheet P1*a* to the conveying path, and the retreat position that is further distant from the first guide member 7 than the guide position and where the second guide member does not interfere with the cut sheet P2 accommodated in the second accommodation part 11*b*. According to the present embodiment, by moving the second guide member 8 to the retreat position, the second guide member 8 does not interfere with the cut sheet P2 accommodated in the second accommodation part 11*b*. This allows the cut sheet P2 to be appropriately accommodated in the second accommodation part 11*b* and also the cut sheet P2 accommodated in the second accommodation part 11*b* to be appropriately guided to the conveying path by the first guide member 7. In addition, by moving the second guide member 8 to the guide position, the roll sheet P1*a* unrolled from the roll body R can be appropriately guided to the conveying path by the second guide member 8. More specifically, the tip end of the roll sheet P1*a* is curled along the rolling direction of the roll body R, i.e., upward. When the second guide member 8 is in the guide position, the second guide member 8 can appropriately guide the curled tip end of the roll sheet P1*a* to the cutter mechanism 4 along the conveying path. This allows the roll sheet P1*a* unrolled from the roll body R and the cut sheet P2 to be appropriately guided to the conveying path in the housing 100*a*, in the printer 100 including the feeding tray 11 capable of being inserted into and pulled out from the housing 100*a* and accommodating the roll body R and the cut sheet P2.

In addition, when the second guide member 8 of the present embodiment is in the retreat position, the second guide member 8 does not interfere with the feeding tray 11 while the feeding tray 11 is inserted into and pulled out from the housing 100*a*. According to this, it is possible to avoid interference between the protruding part (the rear end wall part 18 or the like) of the feeding tray 11 and the second guide member 8 during insertion/pullout of the feeding tray 11.

In addition, when the second guide member 8 of the present embodiment is in the guide position, a part of the second guide member 8 is arranged in the accommodation area A, and when the second guide member is in the retreat position, the entire second guide member 8 is arranged outside the accommodation area A. When conveying the roll sheet P1*a*, the second guide member 8 is in the guide position and the cut sheet P2 is not accommodated in the accommodation area A of the second accommodation part 11*b*. That is, the accommodation area A is an empty space. For this reason, the printer 100 can be made compact by arranging at least a part of the second guide member 8 in the accommodation area A. On the other hand, in a case where the second guide member 8 is in the accommodation area A, the cut sheet P2 and the second guide member 8 interfere with each other when accommodating the cut sheet P2, which hinders accommodation of the cut sheet P2. According to the present embodiment, while realizing compactness of the printer 1, it is possible to avoid contact between the second guide member 8 and the cut sheet P2 when accommodating the cut sheet P2 by placing the entire second guide member 8 in the retreat position outside the accommodation area A. In addition, when the second guide member 8 is in the retreat position, the second guide member 8 is arranged above the indicator 51 which indicates the highest position in which the maximum number of cut sheets P2 are accommodated in the second accommodation part 11*b*. The cut sheet P2 can be accommodated up to a part below the second guide member 8. However, when the second guide member 8 located in the retreat position is present below the indicator 51, the maximum number of cut sheets P2 cannot be accommodated. According to the present embodiment, it is possible to accommodate the maximum number of cut sheets P2 by moving the second guide member 8 to the retreat position.

Further, the second guide member 8 of the present embodiment has the rotary shaft 31 at one end portion on a downstream side in the conveying direction along the conveying path. The second guide member 8 can move between the guide position and the retreat position by rotating about the rotary shaft 31. This enables easy movement between the guide position and the retreat position.

In addition, the printer 100 of the present embodiment includes the feed roller 2, the swing arm 20*a*, the swing shaft 20*b*, and the retreat mechanism 40 configured to move the feed roller 2 and the swing arm 20*a* to the position where the feed roller 2 and the swing arm 20*a* do not interfere with the feeding tray 11 when the feeding tray 11 is inserted into and pulled out from the housing 100*a*. The swing arm 20*a* is provided with the convex portion 21 extending in the right and left direction, and the second guide member 8 has the long hole portion 32 in which the convex portion 21 is inserted. When the feeding tray 11 is inserting into and pulling out from the housing 100*a*, the convex portion 21 moves along the long hole portion 32, so that the second guide member 8 can move in conjunction with movement of the swing arm 20*a*. This allows the second guide member 8 to move to the retreat position in conjunction with the swing arm 20*a* in the printer 100 having a configuration where the feed roller 2 and the swing arm 20*a* are moved to the position where the feed roller 2 and the swing arm 20*a* do not interfere with the feeding tray 11 when inserting/pulling out the feeding tray 11. Thereby, it is possible to avoid contact between the second guide member 8 and the cut sheet P2 or interference between the second guide member 8 and the protruding part (the rear end wall part 18 or the like) of the feeding tray when inserting/pulling out the feeding tray 11.

Further, the second guide member 8 of the present embodiment is arranged on each of both sides outer than the swing arm 20*a* in the right and left direction. This allows the roll sheet P1*a* to be guided by the two second guide members 8. Therefore, the roll sheet P1*a* can be guided more appropriately to the conveying path in the housing 100*a*.

The second guide member 8 of the present embodiment is bent in the direction from the guide position toward the retreat position. According to this, it is possible to avoid mutual contact of the second guide member 8 in the retreat position and the cut sheet P2 even when the number of stacked cut sheets P2 in the second accommodation part 11*b* is large. In addition, even when the tip end of the cut sheet P2 accommodated in the second accommodation part 11*b* is curled upward, the cut sheet P2 is conveyed without contacting the second guide member 8 in the retreat position. Note that, a degree of bending of the second guide member 8 may be adjusted as appropriate according to a degree of curling of the cut sheet P2.

Figure 7:
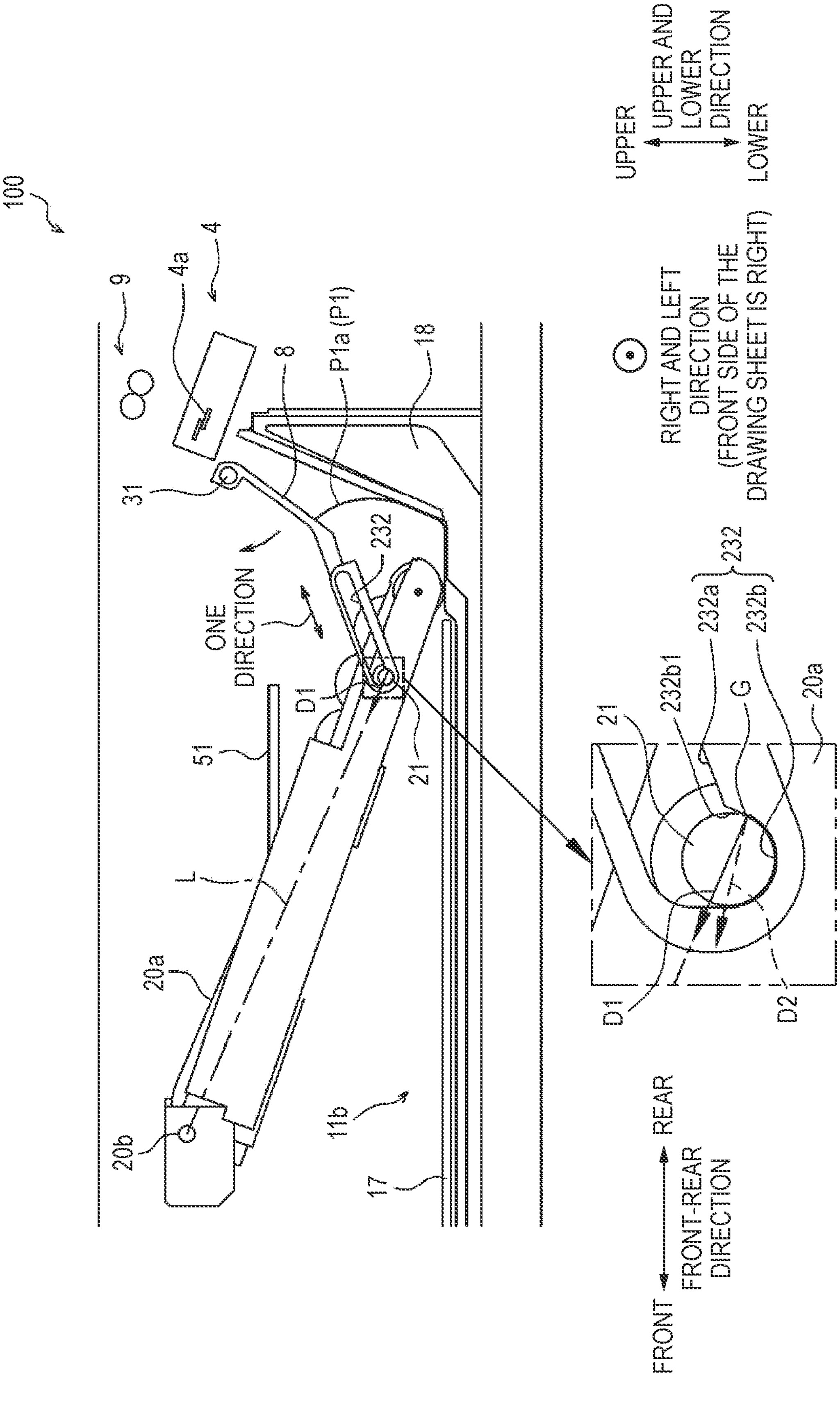
FIG. 7 is an enlarged view of a main part showing a modified embodiment of a long hole portion.

In the above-described embodiment, the long hole portion 32 of the second guide member 8 is configured to guide the convex portion 21 along one direction orthogonal to the axis direction of the rotary shaft 31. However, as shown in FIG. 7, a long hole portion 232 may have a first portion 232*a* configured to guide the convex portion 21 along one direction and a second portion 232*b* configured to guide the convex portion 21 in a direction intersecting with the one direction. In the present modified embodiment, the first portion 232*a* of the long hole portion 232 extends linearly along one direction. The second portion 232*b* is formed to extend from an end portion of the first portion 232*a* farthest from the rotary shaft 31 in an intersection direction (a lower direction in FIG. 7). Note that, an extension length of the second portion 232*b* is shorter than an extension length of the first portion 232*a* and is substantially the same as a radius of the convex portion 21.

As shown in FIG. 7, the second portion 232*b* has a contact surface 232*b*1 configured to come into contact with the convex portion 21 when the tip end of the roll sheet P1*a* contacts the second guide member 8 and the second guide member 8 rotates from the guide position toward the retreat position during feeding of the roll sheet P1*a* by the feed roller 2. The contact surface 232*b*1 is configured to come into contact with an intersection point G, at which a virtual straight line L passing through a center of the convex portion 21 and a center of the swing shaft 20*b* and an outer peripheral surface of the convex portion 21 intersect, when the tip end of the roll sheet P1*a* contacts the second guide member 8, and therefore, the second guide member 8 rotates from the guide position toward the retreat position. The contact surface 232*b*1 is formed to have, in an in-plane direction, a tangential direction to the outer peripheral surface of the convex portion 21 having a cylindrical shape, in a state of being in contact with the convex portion 21 at the intersection point G. In other words, the convex portion 21 and the contact surface 232*b*1 are formed to have such a shape that a force in a direction D1 (the first direction of the present disclosure) from the contact place (intersection point G) of the convex portion 21 and the contact surface 232*b*1 toward the center of the swing shaft 20*b* acts on the swing arm 20*a* when the tip end of the roll sheet P1*a* contacts the second guide member 8 and the second guide member 8 rotates from the guide position toward the retreat position during feeding of the roll sheet P1*a* by the feed roller 2.

The convex portion 21 and the long hole portion 232 are formed in this way, so that even when the second guide member 8 intends to rotate toward the retreat position due to contact of the roll sheet P1*a* during the feeding of the roll sheet P1*a*, it is possible to prevent the moment of rotating upward the swing arm 20*a* from acting on the swing arm 20*a*. This makes it difficult for the feed roller 2 to rise and therefore allows a predetermined feeding force to be applied to the roll sheet P1*a*. In addition, the contact place of the convex portion 21 and the contact surface 232*b*1 is formed to have such a shape that a force in a direction from the contact place of the convex portion 21 and the contact surface 232*b*1 toward the center of the swing shaft 20*b* acts on the swing arm 20*a* when the second guide member 8 rotates from the guide position toward the retreat position due to the contact with the roll sheet P1*a* during the feeding of the roll sheet P1*a* by the feed roller 2. This makes it possible to prevent the swing arm 20*a* from rotating upward and downward even though the second guide member 8 intends to rotate toward the retreat position due to the contact of the roll sheet P1*a* during the feeding of the roll sheet P1*a*. Therefore, it is possible to effectively apply the predetermined feeding force to the roll sheet P1*a*. Note that, when the feeding tray 11 is inserted into and pulled out from the housing 100*a*, the second guide member 8 also smoothly moves in conjunction with the movement of the swing arm 20*a* (i.e., the movement of the convex portion 21).

As another modified embodiment, the convex portion 21 and the contact surface 232*b*1 may also be formed to have such a shape that a force in a direction D2 (a direction denoted with the dashed line in FIG. 7; the second direction of the present disclosure) from the contact place (intersection point G) of the convex portion 21 and the contact surface 232*b*1 toward the lower of the center of the swing shaft 20*b* acts on the swing arm 20*a* when the tip end of the roll sheet P1*a* contacts the second guide member 8 and the second guide member 8 rotates from the guide position toward the retreat position during the feeding of the roll sheet P1*a* by the feed roller 2. This also makes it possible to prevent the moment of rotating upward the swing arm 20*a* from acting on the swing arm 20*a* even though the second guide member 8 intends to rotate toward the retreat position due to the contact of the roll sheet P1*a* during the feeding of the roll sheet P1*a*. Therefore, it is possible to apply the predetermined feeding force to the roll sheet P1*a*.

In addition, in the another modified embodiment, the convex portion 21 and the contact surface 232*b*1 may also be formed to have such a shape that a force in either a horizontal direction or a direction D2 (a direction denoted with the dashed line in FIG. 7) facing upward relative to the horizontal direction acts on the swing arm 20*a* when the tip end of the roll sheet P1*a* contacts the second guide member 8 and the second guide member 8 rotates from the guide position toward the retreat position during the feeding of the roll sheet P1*a* by the feed roller 2. This makes it difficult for the moment of rotating downward the swing arm 20*a* to act on the swing arm 20*a*, and therefore, makes it possible to prevent the feeding force, which is applied from the swing arm 20*a* to the roll sheet P1*a*, from excessively increasing.

Figure 8:
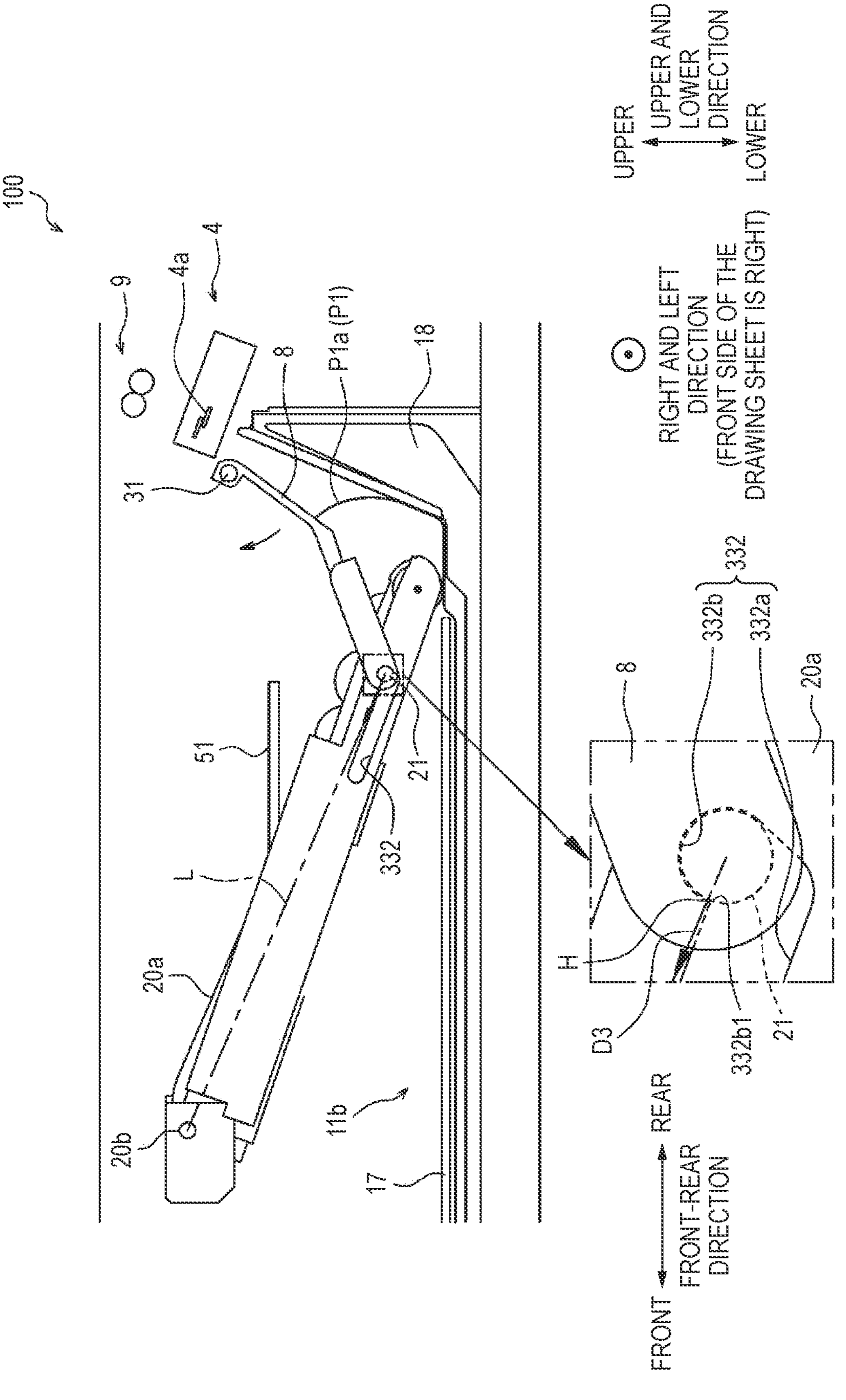
FIG. 8 is an enlarged view of a main part showing another modified embodiment of the long hole portion and a convex portion.

Further, as still another modified embodiment, as shown in FIG. 8, the second guide member 8 may be provided with the convex portion 21 having a cylindrical shape and the swing arm 20*a* may be provided with a long hole portion 332. The convex portion 21 is formed at an end portion of the second guide member 8 farthest from the rotary shaft 31, protruding toward the swing arm 20*a* in parallel to the right and left direction. The long hole portion 332 has a first portion 332*a* configured to guide the convex portion 21 along an extension direction of the swing arm 20*a* and a second portion 332*b* configured to guide the convex portion 21 in a direction intersecting with the extension direction. The first portion 332 extends linearly along the extension direction of the swing arm 20*a*. The second portion 332*b* is formed to extend from an end portion of the first portion 332*a* farthest from the swing shaft 20*b* in an intersection direction (a right oblique upper direction in FIG. 8). Note that, an extension length of the second portion 332*b* is shorter than an extension length of the first portion 332*a* and is substantially the same as the radius of the convex portion 21.

As shown in FIG. 8, the second portion 332*b* has a contact surface 332*b*1 configured to come into contact with the convex portion 21 when the tip end of the roll sheet P1*a* contacts the second guide member 8 and the second guide member 8 rotates from the guide position toward the retreat position during the feeding of the roll sheet P1*a* by the feed roller 2. The contact surface 332*b*1 is configured to come into contact with an intersection point H, at which the virtual straight line L and the outer peripheral surface of the convex portion 21 intersect, when the tip end of the roll sheet P1*a* contacts the second guide member 8, and therefore, the second guide member 8 rotates from the guide position toward the retreat position. The contact surface 332*b*1 is formed to have, in an in-plane direction, a tangential direction to the outer peripheral surface of the convex portion 21, in a state of being in contact with the convex portion 21 at the intersection point H. In other words, the convex portion 21 and the contact surface 332*b*1 are formed to have such a shape that a force in a direction D3 (the first direction of the present disclosure) from the contact place (intersection point H) of the convex portion 21 and the contact surface 332*b*1 toward the center of the swing shaft 20*b* acts on the swing arm 20*a* when the tip end of the roll sheet P1*a* contacts the second guide member 8 and the second guide member 8 rotates from the guide position toward the retreat position during the feeding of the roll sheet P1*a* by the feed roller 2.

Even when the convex portion 21 and the long hole portion 332 are formed in this way, the similar effects to the above-described modified embodiments can be obtained. Note that, also in the present modified embodiment, the convex portion 21 and the contact surface 332*b*1 may also be formed to have such a shape that a force in a direction from the contact place (intersection point H) of the convex portion 21 and the contact surface 332*b*1 toward the lower of the center of the swing shaft 20*b* or a force in either a horizontal direction or a direction facing upward relative to the horizontal direction acts on the swing arm 20*a* when the tip end of the roll sheet P1*a* contacts the second guide member 8 and the second guide member 8 rotates from the guide position toward the retreat position during the feeding of the roll sheet P1*a* by the feed roller 2. Also in this case, the similar effects to the above-described modified embodiments can be obtained. Note that, when the feeding tray 11 is inserted into and pulled out from the housing 100*a*, the second guide member 8 (convex portion 8) also smoothly moves, in conjunction with the movement of the swing arm 20*a* (i.e., the movement of the long hole portion 332).

Further, in each of the above-described modified embodiments, the convex portion 21 has a cylindrical shape but may also have an elliptical shape or a prismatic shape with rounded corners. In addition, the place where the convex portion 21 and the long hole portion 232; 332 contact may be formed to have such a shape that a force in the above-described direction acts on the swing arm 20*a* when the second guide member 8 rotates from the guide position toward the retreat position due to the contact of the roll sheet P1*a*.

Other Modified Embodiments

Although the preferred embodiments of the present disclosure have been described, the present invention is not limited to the above-described embodiments, and can be variously changed within the claims.

In the above-described embodiments, the first guide member 7 is supported on the housing 100*a*. However, the first guide member 7 may also be supported on the feeding tray 11.

In the above-described embodiments, the second guide member 8 can move to the retreat position, in conjunction with insertion and pullout of the feeding tray 11, when the feeding tray 11 is inserted into and pulled out from the housing 100*a*. However, the second guide member 8 may also be configured not to be movable to the retreat position when the feeding tray 11 is inserted into and pulled out from the housing 100*a*. In this case, a configuration is preferable in which even when the second guide member 8 is in the guide position, the second guide member 8 and the protruding part of the feeding tray 11 do not interfere with each other while the feeding tray 11 is inserted into and pulled out from the housing 100*a*. For example, when seen in the front and rear direction, the second guide member 8 in the guide position is preferably arranged in a position in which the second guide member 8 does not overlap the protruding part of the feeding tray 11 in the right and left direction. In addition, the second guide member 8 may be configured to be movable to the retreat position without conjunction with insertion and pullout of the feeding tray 11 when the feeding tray 11 is inserted into and pulled out from the housing 100*a*.

In the above-described embodiments, the second guide member 8 is configured to be movable, in conjunction with movement of the swing arm 20*a*. However, the second guide member 8 may also be configured to be movable, independently of the swing arm. In this case, for example, the second guide member 8 may be configured to move in conjunction with a constitutional component of the feeding tray 11 or may be configured to automatically move to the retreat position by drive of a motor when insertion or pullout of the feeding tray 11 is detected by a sensor or the like. Further, the second guide member 8 may be configured to be movable in conjunction with movement of the swing arm 20*a* by a configuration different from the configuration of the above-described embodiments where the convex portion 21 moves along the long hole portion 32.

Further, in the above-described embodiments, the second guide member 8 may be provided with a long groove portion in which the convex portion 21 is inserted, instead of the long hole portion 32. Further, the long hole portion 232; 332 in each of the above-described modified embodiments may also be formed as a long groove portion capable of inserting and guiding the convex portion 21.

Further, the second guide member 8 may be configured to be manually movable between the guide position and the retreat position. In this case, the second guide member 8 is manually moved to the retreat position when inserting/pulling out the feeding tray 11 or accommodating the cut sheet P2. Further, the second guide member 8 may be configured to be urged toward the guide position by an elastic member such as a spring. In this case, when accommodating the cut sheet P2 in the second accommodation part 11*b*, the second guide member 8 is moved to the retreat position by applying a force to the second guide member 8 in an opposite direction to the urging direction, and the cut sheet P2 is then accommodated. At this time, when the second guide member 8 is in the retreat position, the second guide member 8 contacts an upper surface of the cut sheet P2 accommodated in the second accommodation part 11*b*. Note that, in this case, the urging strength of the elastic member is preferably adjusted so that the second guide member 8 urged in the direction toward the guide position does not suppress the cut sheet P2 too strongly.

In the above-described embodiments, the second guide member 8 is arranged on each of both sides outer than the swing arm 20*a* in the right and left direction, and each extends lengthwise in the right and left direction. However, the two second guide members 8 may partially overlap the swing arm 20*a*, when seen in the upper and lower direction. In addition, one second guide member 8 may be arranged. In this case, preferably, the second guide member 9 extends lengthwise in the right and left direction and is formed slightly longer than the widths of the roll sheet P1*a* and the cut sheet P2.

In the above-described embodiments, when the second guide member 8 is in the guide position, the second guide member 8 may be entirely arranged in the accommodation area A or may not be arranged in the accommodation area A.

Further, in the above-described embodiments, the second guide member 8 may not be bent. For example, the second guide member 8 may extend straightly or may be curved in a direction from the guide position toward the retreat position.

In the above-described embodiments, the second accommodation part 11*b* is located behind the first accommodation part 11*a*. However, the second accommodation part 11*b* may also be located in front of the first accommodation part 11*a*. In this case, the roll sheet P1*a* unrolled from the roll body R accommodated in the first accommodation part 11*a* may be sent from the rear toward the front in the front and rear direction and may be then fed by the feed roller. Note that, in this case, a configuration may be possible in which the roll sheet P1*a* and the cut sheet P2 are sent from the rear toward the front by the feed roller, are sent from the front toward the rear by a roller arranged on a downstream side in the conveying direction along the conveying path, are further sent from the rear toward the front by the roller arranged on a downstream side in the conveying direction and are then guided to the head. That is, the conveying path for the roll sheet P1*a* and the cut sheet P2 may be configured to have an S-shape.

In the above-described first and second embodiments, the feeding tray can be inserted into and pulled out from the housing in the front and rear direction. However, the feeding tray may also be configured to be inserted into and pulled out from the housing in the right and left direction.

The image forming apparatus of the present disclosure can also be applied to a complex machine, a copier and the like, in addition to the printer 100. In addition, the printer is not limited to the inkjet type and may also be a laser type. Further, the sheet-shaped medium of the present disclosure may also be a cloth, a label or the like, in addition to the sheet.

What is claimed is:

1. An image forming apparatus comprising:

a housing in which a conveying path is formed;

a feeding tray capable of being inserted into and pulled out from the housing, and including a first accommodation part in which a roll body having a configuration where a sheet-shaped medium is rolled in a roll shape is accommodated;

an image forming unit configured to form an image on a sheet-shaped medium provided in the conveying path;

a feed roller configured to feed a sheet-shaped medium from the feeding tray toward the conveying path;

a first guide member configured to guide a sheet-shaped medium to the conveying path; and a second guide member configured to guide a roll medium, which is a sheet-shaped medium unrolled from the roll body, to the conveying path, wherein the feeding tray has the first guide member and the second guide member is located on an opposite side to the first guide member, the roll medium being interposed between the first guide member and the second guide member, wherein the second guide member is further configured to be movable, and wherein the second guide member extends downstream of the feed roller in a conveying direction of the sheet-shaped medium toward the conveying path.

2. The image forming apparatus according to claim 1, wherein the second guide member is supported on the housing.

3. The image forming apparatus according to claim 1, wherein the second guide member is configured to be movable between a first position where the second guide member guides the roll medium to the conveying path, and a second position that is more distant from the first guide member than the first position.

4. The image forming apparatus according to claim 3, wherein the second guide member being in the second position does not interfere with the feeding tray while the feeding tray is inserted into and pulled out from the housing.

5. The image forming apparatus according to claim 3, further comprising:

a feeding tray including a second accommodation part in which a plurality of sheet-shaped media are accommodated in a state of being stacked, wherein in a state that the second guide member is in the first position, at least a part of the second guide member is arranged in an accommodation area where a sheet-shaped medium enables to be accommodated in the second accommodation part, and wherein in a state that the second guide member is in the second position, an entirety of the second guide member is arranged outside the accommodation area.

6. The image forming apparatus according to claim 5, wherein the second guide member being in the second position is arranged above a highest position of the stacked sheet-shaped media in which a maximum number of the sheet-shaped media are accommodated in the second accommodation part.

7. The image forming apparatus according to claim 3, further comprising:

a swing arm configured to support the feed roller to be rotatable;

a swing shaft configured to support the swing arm to be swingable; and a retreat mechanism configured to move the feed roller and the swing arm to a position where the feed roller and the swing arm do not interfere with the feeding tray, when the feeding tray is inserted into and pulled out from the housing, wherein the second guide member is configured to be movable to the second position in conjunction with insertion and pullout of the feeding tray with respect to the housing, and wherein the second guide member is configured to be movable to the second position in conjunction with a movement of the swing arm.

8. The image forming apparatus according to claim 7, wherein one of the swing arm and the second guide member is provided with a convex portion extending in a direction orthogonal to an insertion/pullout direction of the feeding tray, the other of the swing arm and the second guide member has a long hole portion formed along a direction orthogonal to an extension direction of the convex portion, the convex portion being inserted in the long hole portion, and the convex portion moves along the long hole portion when the feeding tray is inserted into and pulled out from the housing, such that the second guide member is movable in conjunction with the movement of the swing arm.

9. The image forming apparatus according to claim 8, wherein the second guide member has a rotary shaft at one end portion on a downstream side in a conveying direction along the conveying path, the second guide member is configured to be movable between the first position and the second position by rotating about the rotary shaft, the feed roller is arranged below the rotary shaft and the swing shaft and between the rotary shaft and the swing shaft in the insertion/pullout direction, in a state that the second guide member is in the first position, and the convex portion and the long hole portion are formed to have a shape that a force in either a first direction from a contact place of the convex portion and the long hole portion toward a center of the swing shaft or a second direction from the contact place toward a lower of the center of the swing shaft acts on the swing arm when the second guide member rotates from the first position toward the second position due to contact with the roll medium during feeding of the roll medium by the feed roller.

10. The image forming apparatus according to claim 9, wherein the second direction is either a horizontal direction or a direction facing upward relative to the horizontal direction.

11. The image forming apparatus according to claim 9, wherein the contact place is formed to have a shape that the force in the first direction acts on the swing arm when the second guide member rotates from the first position toward the second position due to the contact with the roll medium during feeding of the roll medium by the feed roller.

12. The image forming apparatus according to claim 8, wherein the swing arm is provided with the convex portion, and the second guide member is provided with the long hole portion.

13. The image forming apparatus according to claim 7, wherein the second guide member is arranged on each of both sides more outside than the swing arm in a direction orthogonal to the insertion/pullout direction of the feeding tray.

14. The image forming apparatus according to claim 3, wherein the second guide member is bent in a direction from the first position toward the second position.

15. The image forming apparatus according to claim 3, wherein the feeding tray includes a second accommodation part in which a plurality of sheet-shaped media are accommodated in a stacked state, and the second guide member being in the second position does not interfere with a sheet-shaped medium accommodated in the second accommodation part.

16. The image forming apparatus according to claim 3, wherein the conveying path between the first guide member and the second guide member when the second guide member is in the first position becomes narrower toward a downstream side in a conveying direction of a sheet-shaped medium.

17. The image forming apparatus according to claim 1, further comprising a plurality of second guide members, wherein the second guide members are arranged on both sides of the feed roller.

18. The image forming apparatus according to claim 1, wherein a pair of rollers are provided at an upstream side in a conveying direction of a sheet-shaped medium in the image forming unit, a cutter mechanism is arranged in a position on a further upstream side than the pair of rollers in the conveying direction of the sheet-shaped medium, and the sheet-shaped medium is guided to the cutter mechanism by the first guide member and the second guide member.

19. The image forming apparatus according to claim 1, wherein the second guide member has a rotary shaft at one end portion on a downstream side in a conveying direction along the conveying path, and the second guide member is configured to be movable by rotating about the rotary shaft.

20. An image forming apparatus comprising:

a housing in which a conveying path is formed;

a feeding tray capable of being inserted into and pulled out from the housing, and including a first accommodation part in which a roll body having a configuration where a sheet-shaped medium is rolled in a roll shape is accommodated;

an image forming unit configured to form an image on a sheet-shaped medium provided in the conveying path;

a first guide member configured to guide a sheet-shaped medium to the conveying path; and a second guide member configured to guide a roll medium, which is a sheet-shaped medium unrolled from the roll body, to the conveying path, wherein the second guide member is located on an opposite side to the first guide member, the roll medium being interposed between the first guide member and the second guide member, wherein the second guide member is further configured to be movable, and wherein the second guide member, when in a first position where the second guide member guides the roll medium to the conveying path, does not interfere with the first guide member and extends toward the conveying path.

21. The image forming apparatus according to claim 20, wherein the second guide member is supported on the housing.

22. The image forming apparatus according to claim 20, wherein the second guide member is configured to be movable between the first position and a second position that is more distant from the first guide member than the first position.

23. The image forming apparatus according to claim 20, further comprising a plurality of second guide members, wherein the second guide members are arranged on both sides of a feed roller.

* * * * *